United States Patent [19]
Schmidt

[11] 3,743,101
[45] July 3, 1973

[54] SCREEN CHANGER
[76] Inventor: Ludwig Schmidt, 109 W. Muskegon Avenue, Whitehall, Mich.
[22] Filed: Apr. 18, 1972
[21] Appl. No.: 245,228

[52] U.S. Cl. .............................................. 210/447
[51] Int. Cl. ............................................ B01d 35/00
[58] Field of Search .................... 241/82.1, 83, 89.3, 241/89.2; 425/197, 198, 199, 200, 202; 210/447

[56] References Cited
UNITED STATES PATENTS
2,661,497  12/1953  Birmingham .................... 425/199 X
2,838,084   6/1958  Samler ............................ 425/198 X
3,145,746   8/1964  Scher ............................. 425/198 X Primary Examiner—Willie G. Abercrombie
Attorney—Peter P. Price, Daniel Van Dyke et al.

[57] ABSTRACT

A pair of removable strainers are mounted in a slide movable to position either strainer in the flow passageway of an extruder. The slide is locked into position by a spherical bulb rotatable in a seating cup and a wedge block intermediate the slide and bulb. The seating cup, bulb and wedge block all include openings alignable with the passageway. Movement of the wedge block to release the wedge engagement between the slide and bulb permits rapid movement of the slide from one position to the other to permit changing of the strainers during continuous operation of the extruder.

8 Claims, 2 Drawing Figures

PATENTED JUL 3 1973 3,743,101

SCREEN CHANGER

BACKGROUND OF THE INVENTION

This invention relates to an apparatus for changing screens in an extruder and more particularly to a novel screen changer with a self-aligning slide.

A strainer is utilized in an extruder to prevent oversized particles from entering the die. At the same time, the shearing effect causes a more thorough mixing and breaking up of the fluid mass flowing into the die. The strainers eventually become blocked and it is customary to change them or replace a screen insert. The prior art provides various forms of a magazine arrangement whereby a fresh clean strainer is movable into the flow passageway while the blocked one is removed to a position to allow cleaning without interrupting production.

The utilization of a magazine arrangement ideally requires a rapid and accurate movement or rotation of a slide means without resulting in any loss of material. To date, the prior art has not provided such a device. Those devices which provide adequate clearance for quick movement are burdened with material losses while those devices presently acceptable relative to material loss are too complex and costly and hence undesirable. Thus, there is a need for an improved screen changing apparatus which is economically attractive to manufacture, simple to operate and substantially eliminates loss of material while maintaining full volume steady state screening.

SUMMARY OF THE INVENTION

Conventionally, an extruder such as a screw type extruder for working up plastic materials includes a strainer means at the mouth of the inlet passageway to the die between the screw and die. In accordance with the invention, a flat faced slide is movable across the passageway and includes a pair of openings selectively alignable in the passageway for receipt of the strainer means. With one means operable in the flow passageway, the other is exposed for cleaning or changing. The slide is seated by a wedge block having a wedge face movable relative to a swivel means to provide positive wedge seating of the slide relative to the passageway. The swivel means is seated in a cup means to permit oscillatory self-alignment as the wedge face is moved into or out of wedge engagement. The cup means, swivel means and wedge block all have flow openings alignable in the passageway.

A significant advantage of the invention is the relatively minute clearance required between the slide and wedge block to permit full lateral movement of the slide across the passageway. Since the faces of the slide are flat, there is negligible clearance for leakage as opposed to a slide having wedge shaped parts requiring greater separation. At the same time, the operational motion and structural arrangement is extremely simple. Slight movement of the wedge block applies or releases wedge movement between the swivel means and wedge block to free or lock the slide relative to the flow passageway while the cross section of any clearance required to permit relative movement is an absolute minimum.

An additional advantage is the improved alignment and service-life provided by the swivel means. Since the swivel means can float relative to the passageway axis, it will always seek a flat-face relationship with the wedge block and prevent uneven wear and tear which would introduce leakage into the system.

DESCRIPTION OF THE PREFERRED EMBODIMENT

Figure 1:
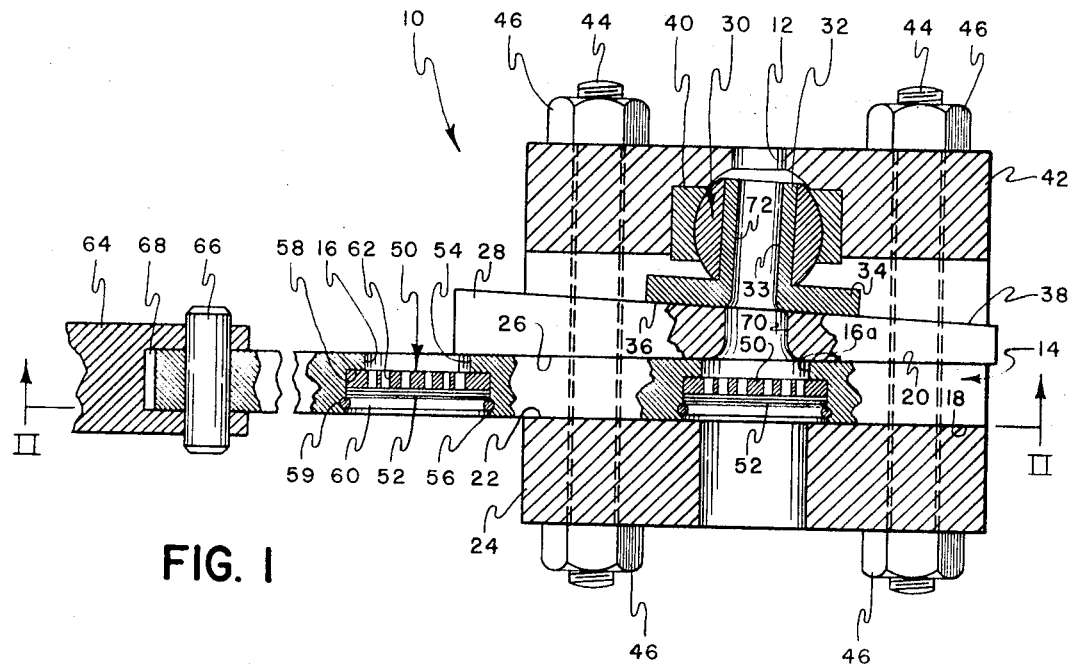
FIG. 1 is a fragmentary plan view in cross section of a screen changing apparatus provided by the invention.

The screen changing apparatus of the invention is represented in the drawings by the reference numeral 10 and is adapted to be mounted in the flow passageway of an extruder generally at the inlet to the die. In a screw extruder, the screen is preferably positioned intermediate the die and screw. The extruder itself is not shown in the drawings nor described herein since the type or particular arrangement of extruder is not a part of the present invention. Reference numeral 12 designates generally the flow passageway for the fluid mass as it enters the die.

Referring now to the drawings in greater detail, a slide 14 having an elongated rectangular flat-plate configuration is slideable endwise transverse to passageway 12 to align one of two openings 16 and 16a with the passageway. Slide 14 has two flat faces 18 and 20 which abut respectively against the flat face 22 of a mounting plate 24 and the flat face 26 of a wedge block 28. Wedge block 28 is sandwiched between slide 14 and a swivel means 30 preferably comprised of a truncated sphere or bulb. Bulb 30 includes a flange insert 32, the flange portion 34 of which provides an abutment face 36 and is engageable with the tapered face 38 of wedge block 28. Bulb 30 is held in place by a seating cup 40 recessed within a second mounting plate 42. Mounting plates 24 and 42 are adapted to secure the screen changer 10 at a particular point along passageway 12 by sandwiching slide 14, wedge block 28 and bulb 30 intermediate the two plates. Plates 24 and 42 are anchored appropriately by a plurality of mounting shanks 44 threaded on each end for receipt of a plurality of nuts 46. The mounting plates and screen changing apparatus 10 are aligned with the extruder flow passageway by other conventional means not shown.

Openings 16 and 16a of slide 14 are identical to each other and form a seat for receipt of a straining element 50 and screen element 52. Openings 16 and 16a have a stepped cross section with the narrower or reduced portion 54 being downstream with respect to the direction of mass flow relative to the enlarged portion 56. The transition between the enlarged and reduced cross-sectional portions 54 and 56 form a shoulder 58 against which strainer 50 is held. The outer diameter of strainer 50 and screen 52 corresponds generally to the diameter of the enlarged cross-sectional portion 56 so that it is receivable therein and is aligned within openings 16 and 16a generally perpendicular to the direction of flow. An annular recess 59 is formed in the enlarged portion 56 for receipt of an expandable ring 60 which seats in recess 59 to lock strainer 50 and screen 52 in place. Removal of either strainer 50 or screen 52 is permitted upon removal of ring 60.

The strainer 50 preferably includes a plurality of openings aligned with the flow passageway. The size of the openings determines the magnitude of any particular solid which will be permitted into the die. As the fluid mass is sheared against strainer 50 and openings 62 they are additionally mixed and broken down as required. An independent screen 52 is preferably utilized to catch dirt and the like, the screen being generally disposable. The screen can be of a porous material as shown in the drawings, or can likewise include a plurality of openings identical to or dissimilar in magnitude to those of strainer 50. It will be appreciated that a single strainer or screen could be utilized in place of the two-part construction shown.

Preferably, a hydraulic cylinder (not shown) utilizing a ram 64 is connected to slide 14 to provide rapid changing of slide 14 between opening 16 and 16a. As shown in FIG. 1, slide 14 is interconnected to ram 64 by a pin 66 which mounts the slide in a clevis portion 68 of ram 64. By rapid movement of slide 14, the time lapse in which the flow passageway 12 is blocked by that portion of slide 14 intermediate opening 16 and 16a is minuscule. Hence, the extruder can operate essentially on a steady state continuous basis even though the screening apparatus requires frequent changing.

It will be obvious from the drawings that with the slide arranged so that opening 16a is in alignment with passageway 12, opening 16 is removed from the extruder to permit quick and easy changing or cleaning of the strainer 50 and screen 52 mounted within opening 16. Likewise, rapid movement of slide 14 from left to right in the drawings so that opening 16 is positioned in alignment with passageway 12 positions opening 16a likewise beyond the extruder to the opposite side to permit quick and simple replacement or cleaning of the strainer 50 and screen 52 mounted therein.

The unique lock and release mechanism provided by the invention to substantially eliminate any leakage will now be described in detail. Immediately adjacent slide 14 and in abutment therewith downstream with respect to the mass flow is a wedge block 28. Preferably, wedge block 28 is an elongated plate-like member similar dimensionally to slide 14 except that it includes a tapered wedge face 38 which provides the wedging. Wedge block 28 includes a single opening 70 the cross-sectional diameter of which is necked down or reduced relative to the diameter of opening 16 and 16a of slide 14. The reduced diameter is in part warranted by the reduction in flow caused by strainer 50 and screen 52. It is also reduced relative to the opening in slide 14 and bulb 30 in order to permit adequate flow through bulb 30 since the lateral position of wedge block 28 cannot be articulated precisely as wear and tear takes its place at the wedging interfaces 36,38 and 20,26.

Bulb 30 has an overall truncated spherical configuration and is seated in a cup member 40 recessed within mounting plate 42 so that the opening of bulb 30 is alignable in passageway 12 although it is free to float or oscillate within cup 40 slightly out of axial alignment with passageway 12. Flange insert 32 is comprised of a bushing 33 having a flange 34 at one end. Bushing 33 is mounted snugly within the opening of bulb 30 so that flange 34 is in abutment with wedge block 28. Insert 32 has an opening 72 alignable with passageway 12 and opening 70 in wedge block 23 although it will likewise float or oscillate jointly with bulb 30 slightly out of axial alignment with passageway 12. The diameter of opening 72 as shown in FIG. 1 is preferably less than opening 70 in wedge block 28 to accommodate full flow through wedge block 28 regardless of the final wedging position of the block.

The utilization of a flange insert 32 as described and shown is not essential to the operation of this invention although it does provide a larger bearing surface 36 which reduces overall wear and tear. However, it will be appreciated that a truncated sphere would provide a substantial bearing surface engageable with taper 38 of wedge block 28. In the latter case, a disk-like truncated sphere is preferred. Preferably, bulb 30 and insert 32 are comprised of bronze. This prolongs the service-life of both the insert and bulb as they are frictionally engaged by wedge block 28 and seating cup 40.

OPERATION

Figure 2:
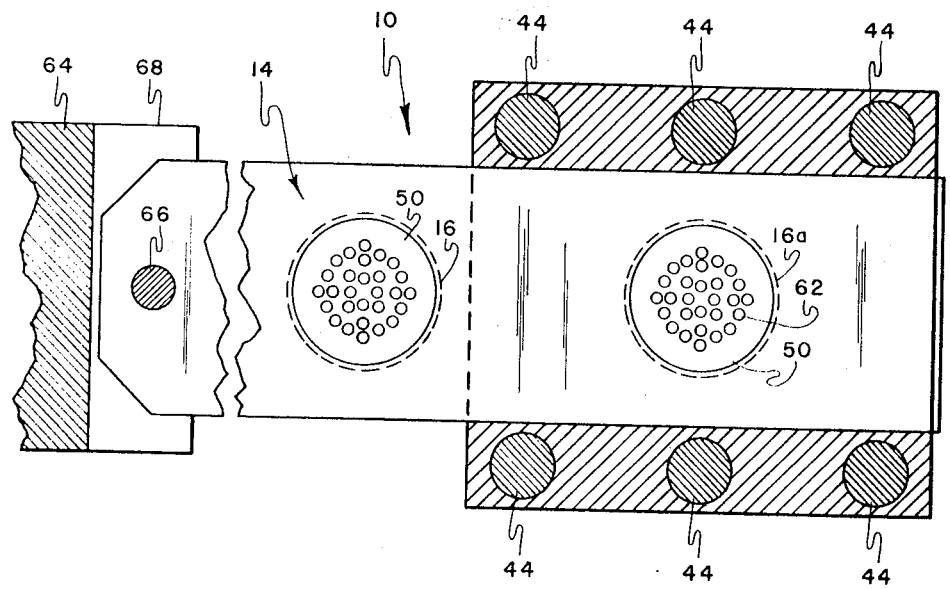
FIG. 2 is a fragmentary cross-sectional view of the changer illustrated in FIG. 1 taken along line II—II.

Having described the various components in detail, the operation of screen changing apparatus 10 should be obvious. With opening 16a in alignment with passage 12 as shown in FIGS. 1 and 2, the slide is locked in this position by movement of wedge block 28 from left to right. Taper face 38 will slide relative to face 36 of flange 34 causing the exertion of axial forces against slide 14 and bulb 30. The rotatability of bulb 30 assures constant flat-face alignment of the bulb to compensate for wear and tear and avoid uneven wear. With the wedge block and bulb positioned generally as shown in FIG. 1, fluid mass flow through the strainer 50 is assured with little or no leakage.

When it is desired to clean or change strainer 50 and screen 52 in opening 16a, the wedge engagement which locks the slide in the position shown must be released in order to permit rapid movement of slide 14 from left to right so that opening 16 is in alignment with passageway 12. This is accomplished by movement of wedge block 28 from right to left (FIG. 1) a relatively small distance. The distance of movement is only enough to release the positive wedge force projected axially against slide 14 so that it can be moved laterally to remove opening 16a from flow passageway 12 and align therein opening 16. Since the abutting interface between faces 18, 22 and 20, 26 is flat, there is a minimum of separation between the faces through which any of the fluid mass can leak during the screen changing. Furthermore, when the minute clearance is considered in relation to the time lapse necessary to position slide 14 in one or the other positions, leakage is if not completely, almost completely eliminated. It will be appreciated that some clearance is required in order to permit movement of slide 14. However, this clearance is minimized at all points along the slide. As soon as the slide is repositioned, wedge block 28 is once more moved from left to right to provide the positive locking of slide 14 in either of the two positions. Wedge block 28 can be hydraulically actuated although no specific structure is shown.

The operation of the screen changer as noted is extremely simple. None of the component parts require irregular or complex machining such that the overall cost of the screen changing apparatus itself is relatively inexpensive when compared to existing devices. The positioning and alignment of the slide is extremely accurate and in accordance with the utilization of bulb 30 leakage will not result from irregular wear and tear since the bulb will continually seek the most positive interface position since it is free to rotate generally axially as well as oscillate or float out of axial alignment to follow the taper face of wedge block 28.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

I claim:

1. A double strainer apparatus for extruders comprising, in combination: a flow passageway in the extruder; a slide movable in guide means across said passageway and having a pair of openings alignable with said passageway; removable straining means receivable in said openings to strain the flow of mass through said passageway; bulb means aligned in said passageway to permit flow through said bulb means in said passageway; a seat means likewise having an opening aligned with said passageway for seating said bulb means to permit rotatable movement of said bulb means in said seat means; and a wedge block positioned intermediate said bulb means and slide, said wedge block likewise having an opening in alignment with said passageway and engageable with said bulb means to provide positive wedge engagement and disengagement between said bulb means and slide as said wedge block is moved transversely to said passageway, said slide being movable in said guide means when said wedge block is out of wedge engagement with said bulb means and locked in said guide means when said wedge block is in wedge engagement with said bulb means.

2. The apparatus according to claim 1 wherein the faces of said slide engageable in said guide means are flat to minimize the clearance necessary to permit movement of said slide in said guide means.

3. The apparatus according to claim 2 wherein said wedge block includes a flat surface and tapered surface, said flat surface being in engagement with one of the surfaces of said slide to form part of said guide means, said tapered surface being in engagement with said bulb means.

4. The apparatus according to claim 3 wherein said bulb means includes a general spherical shape to permit rotation of said bulb means about the axis of said passageway, said bulb means also being movable so that the axis of said bulb means is movable slightly out of alignment with said passageway axis.

5. The apparatus according to claim 4 wherein said bulb means includes a flange extending radially relative to the axis of said bulb means, said flange including a flat surface engageable with said tapered surface of said wedge block.

6. Apparatus for straining mass movable through a flow passageway comprising, in combination: a magazine having at least two openings; straining means mounted in said openings; said magazine being movable to align either of said openings with said passageway to strain flow through one of said straining means and permit replacement or cleaning of said other straining means; guide means for said magazine; and releasable lock means for locking said magazine in one of said positions, said lock means when released permitting movement of said magazine in said guide to the other of said positions, said lock means comprising a wedge block having a flat face engageable with said magazine for clamping said magazine in said guide means and a wedge surface engageable with a self-aligning swivel means for providing said clamping force, said swivel means and wedge block having openings aligned in said flow passageway.

7. Apparatus according to claim 6 wherein said apparatus further includes a pair of spaced mounting plates for spacing said apparatus in said flow passageway, said magazine being sandwiched intermediate said mounting plates and having an elongated flat plate configuration, one of the sides of said magazine being slidably engaged with the face of one of said mounting plates and the other side being slidably engaged with said flat face of said wedge block, said wedge block and said mounting plate forming said guide means; said other of said mounting plates including a seat means for holding said swivel means, said swivel means comprising a truncated bulb movable in said seat means for rotation about the axis of said flow passageway and further rotation whereby the axis of said bulb opening is out of alignment with the axis of said flow passageway.

8. Apparatus according to claim 7 wherein said bulb and seat include matching spherical surfaces in engagement with each other, said bulb including a flange having a flat face engageable with the wedge surface of said wedge block so that when said wedge block is moved into wedging engagement with said bulb, said magazine is clamped intermediate said wedge block and said mounting plate to prevent leakage of mass flow through said flow passageway, and when said wedge block is moved slightly away from wedging engagement with said bulb, said magazine is movable intermediate said wedge block and said mounting plate, the clearance therebetween being substantially small enough to inhibit leakage of said mass flow therebetween as said magazine is moved to position the other of said strainer means in said flow passageway.

* * * * *